United States Patent
Smith

(10) Patent No.: US 11,503,817 B1
(45) Date of Patent: Nov. 22, 2022

(54) FISH LURES AND METHODS FOR MAKING FISH LURES AND LURING FISH

(71) Applicant: Eric Smith, Waverly, WA (US)

(72) Inventor: Eric Smith, Waverly, WA (US)

( * ) Notice: Subject to any disclaimer, the term of this patent is extended or adjusted under 35 U.S.C. 154(b) by 438 days.

(21) Appl. No.: 16/575,373

(22) Filed: Sep. 18, 2019

Related U.S. Application Data

(60) Provisional application No. 62/733,467, filed on Sep. 19, 2018.

(51) Int. Cl.
    *A01K 85/18* (2006.01)

(52) U.S. Cl.
    CPC .................. *A01K 85/18* (2013.01)

(58) Field of Classification Search
    CPC .. A01K 85/019; A01K 85/16; A01K 85/1811; A01K 85/1821
    USPC ....................................... 43/42.24
    See application file for complete search history.

(56) References Cited

U.S. PATENT DOCUMENTS

| | | |
|---|---|---|
| 2,149,054 A | 2/1939 | Jones |
| 2,847,791 A * | 8/1958 | Simmons .............. A01K 85/16 43/42.26 |
| 3,685,192 A | 8/1972 | Stibbard |
| 4,464,857 A | 8/1984 | Olszewski |
| 4,697,378 A | 10/1987 | Tunstall |
| 5,193,299 A * | 3/1993 | Correll ................... A01K 85/00 43/42.47 |
| D369,200 S | 4/1996 | Huddleston et al. |
| 5,918,405 A | 7/1999 | Marusak et al. |
| 5,946,848 A | 9/1999 | Ysteboe et al. |
| 6,041,540 A | 3/2000 | Potts |
| 6,606,815 B1 | 8/2003 | Toris |
| 6,647,660 B1 | 11/2003 | Kruger |
| 6,857,220 B2 * | 2/2005 | King ...................... A01K 85/00 43/42.24 |
| 7,356,963 B2 | 4/2008 | Scott |
| D570,444 S | 6/2008 | Scott et al. |
| 7,627,979 B2 * | 12/2009 | Huddleston ............ A01K 85/00 43/42.22 |
| 8,181,382 B2 | 5/2012 | Pack |
| D662,172 S | 6/2012 | Rago |
| 8,490,319 B2 | 7/2013 | Mancini et al. |
| D710,483 S | 8/2014 | Cook et al. |
| 8,915,012 B2 | 12/2014 | Burdick |
| 8,966,810 B2 * | 3/2015 | Scott ...................... A01K 85/00 43/42.22 |
| 10,051,847 B1 | 8/2018 | Smith |
| D849,182 S | 5/2019 | Ahmed |

(Continued)

FOREIGN PATENT DOCUMENTS

| | | |
|---|---|---|
| CA | 2219706 | 4/1999 |
| GB | 2239151 | 6/1991 |

*Primary Examiner* — Christopher P Ellis
(74) *Attorney, Agent, or Firm* — Wells St. John P.S.

(57) ABSTRACT

Soft bait lures emulating a fish are provided. The lure can provide at least one channel within at least one of the exterior surfaces of the tail. Methods for manufacturing a soft bait fishing lure are also provided. The methods can include removing one or more portions of one or more exterior surfaces of the tail to define one or more channels within the one or more surfaces of the tail. Methods for luring fish using a soft bait fishing lure are also provided. The methods can include channeling at least some of the water through one or more channels within the surface of the tail of the fishing lure.

7 Claims, 6 Drawing Sheets

(56) References Cited

U.S. PATENT DOCUMENTS

| | | | |
|---|---|---|---|
| 11,234,422 B2* | 2/2022 | Koppers | A01K 85/18 |
| 2006/0260176 A1 | 11/2006 | Yeung | |
| 2008/0078114 A1 | 4/2008 | Pack | |
| 2010/0115822 A1* | 5/2010 | Huddleston | A01K 85/00 43/42.15 |
| 2010/0146837 A1 | 6/2010 | Zernov | |
| 2013/0036654 A1 | 2/2013 | Goosey | |
| 2013/0081319 A1* | 4/2013 | Scott | A01K 85/00 43/42.03 |
| 2015/0208627 A1 | 7/2015 | Coniglio | |
| 2016/0120159 A1 | 5/2016 | Tsybulnyk | |
| 2020/0260703 A1* | 8/2020 | Grosell | A01K 85/16 |
| 2020/0352148 A1* | 11/2020 | Mancini | A01K 85/01 |
| 2021/0007338 A1* | 1/2021 | Priore | A01K 85/16 |

\* cited by examiner

FISH LURES AND METHODS FOR MAKING FISH LURES AND LURING FISH

CROSS REFERENCE TO RELATED APPLICATION

This application claims priority to and the benefit of U.S. Provisional Patent Application Ser. No. 62/733,467 filed Sep. 19, 2018, entitled "Fish Lures and Methods of Making Fish Lures", the entirety of which is incorporated by reference herein.

TECHNICAL FIELD

The present disclosure relates to fishing lures and more specifically articulated fishing lures, manufacturing methods, and uses.

BACKGROUND

Fishing lures have become increasingly important in game fishing as well as industrial fishing. Current lures can be powered and/or articulated to simulate bait fish. This simulation can include weighting the lure properly and/or articulating the lure in certain portions to allow for the lure to simulate bait fish upon a dragging motion and/or sinking motion. The present disclosure provides fishing lures and fishing lure production methods and uses.

SUMMARY

Soft bait lures emulating a fish are provided. The lures can include a fish emulating body extending from a head to a tail. The tail can define: an end upper point substantially aligned with a dorsal line of the body; an end lower point substantially aligned with a pelvic line of the body; and opposing end mid points substantially aligned with lateral lines of the body, each of these end points extending along individual upper, lower, and midpoint surfaces of the tail to terminate at a caudal peduncle of the lure. The lure can provide at least one channel within at least one of the exterior surfaces of the tail.

Methods for manufacturing a soft bait fishing lure are also provided. The methods can include: providing a soft bait fishing lure having a tail; and removing one or more portions of one or more exterior surfaces of the tail to define one or more channels within the one or more surfaces of the tail.

Methods for luring fish using a soft bait fishing lure are also provided. The methods can include, while providing a flow of water from head to tail of a fishing lure, channeling at least some of the water through one or more channels within the surface of the tail of the fishing lure.

DRAWINGS

Embodiments of the disclosure are described below with reference to the following accompanying drawings.

DESCRIPTION

This disclosure is submitted in furtherance of the constitutional purposes of the U.S. Patent Laws "to promote the progress of science and useful arts" (Article 1, Section 8).

Figure 1:
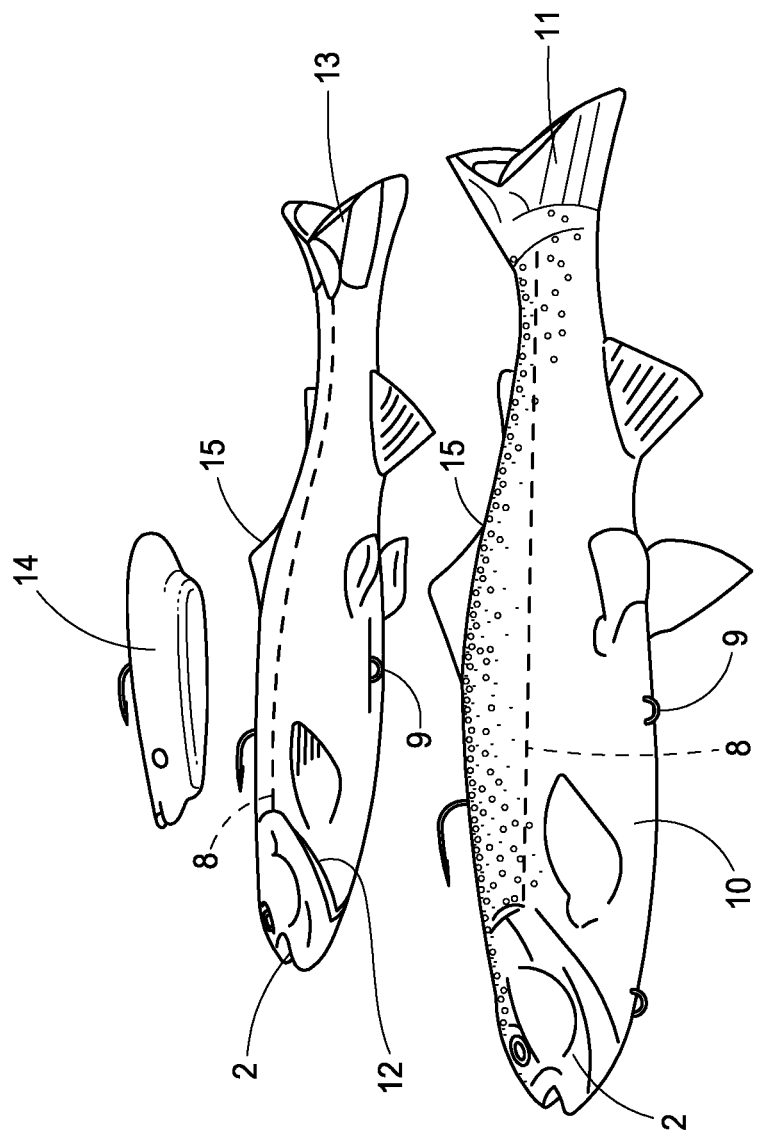
FIG. 1 is a depiction of two fish lures and a fish lure insert according to an embodiment of the disclosure.

The fish lures and methods of making fish lures according to embodiments of this disclosure will be described with reference to FIGS. 1-6. Turning first to FIG. 1, a series of fish lures is shown and represented as fish lure 10, fish lure 12, and fish lure insert 14. As can be seen, the fish lures have a belly or pelvic side 9, a dorsal side 15, a lateral line 8, as well as a head 2 and a tail. In accordance with example implementations, fish lure 10 can include tail 11, and fish lure 12 can include tail 13. In accordance with example implementations, specific constructs of the tail can substantially align with specific constructs of the lure body.

Figure 2:
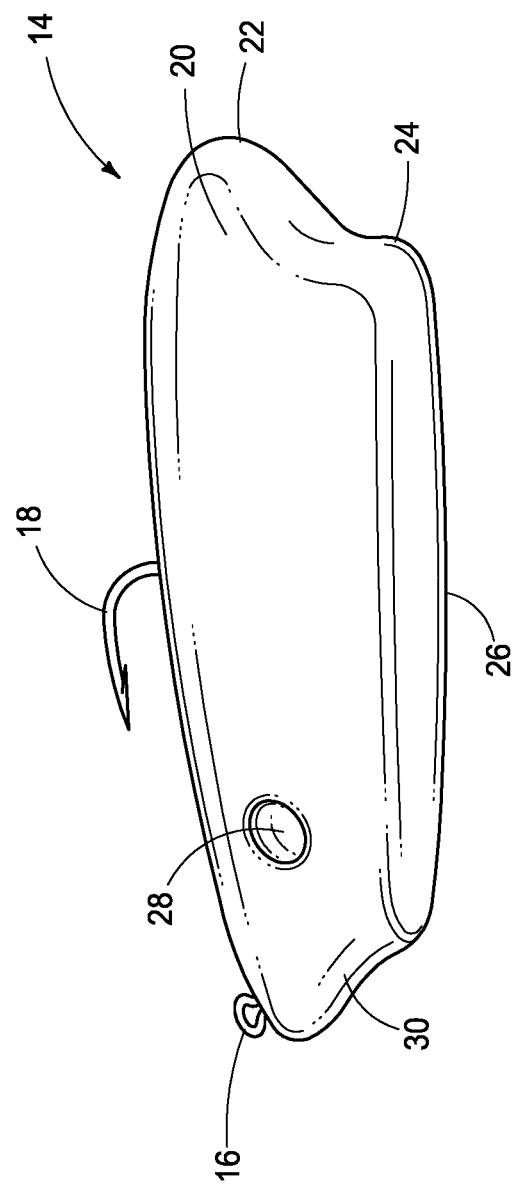
FIG. 2 is a fish lure insert according to an embodiment of the disclosure.

Referring next to FIG. 2, a fish lure insert to be encased in a soft fish lure body as shown in FIG. 1 is shown in FIG. 2 as insert 14. In accordance with example implementations, insert 14 can include a hard cast plastic body that includes an eyelet 16 as well as a hook 18 projecting from a dorsal side of fish lure 14. In accordance with example implementations, the fish lure hard body 20 of insert 14 can include a bulbous end 22 as well as receding to a less indented end 24. Less indented end 24 can extend in a substantially planar manner or flat manner 26 to a forward portion of body 20. Associated with forward portion body 20 can be a hole or eyelet 28, as well as an indented or non-normal portion 30 extending to eyelet 16.

Figure 3:
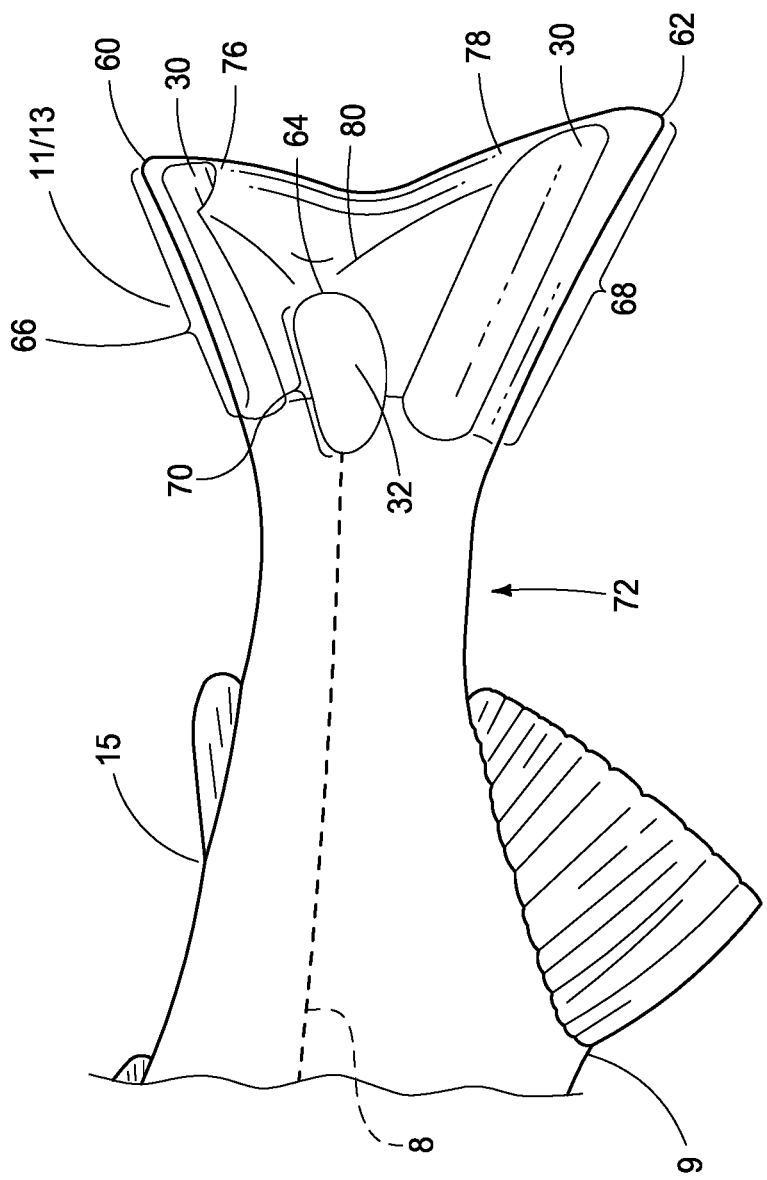
FIG. 3 is a portion of a fish lure tail according to an embodiment of the disclosure.
Figure 4:
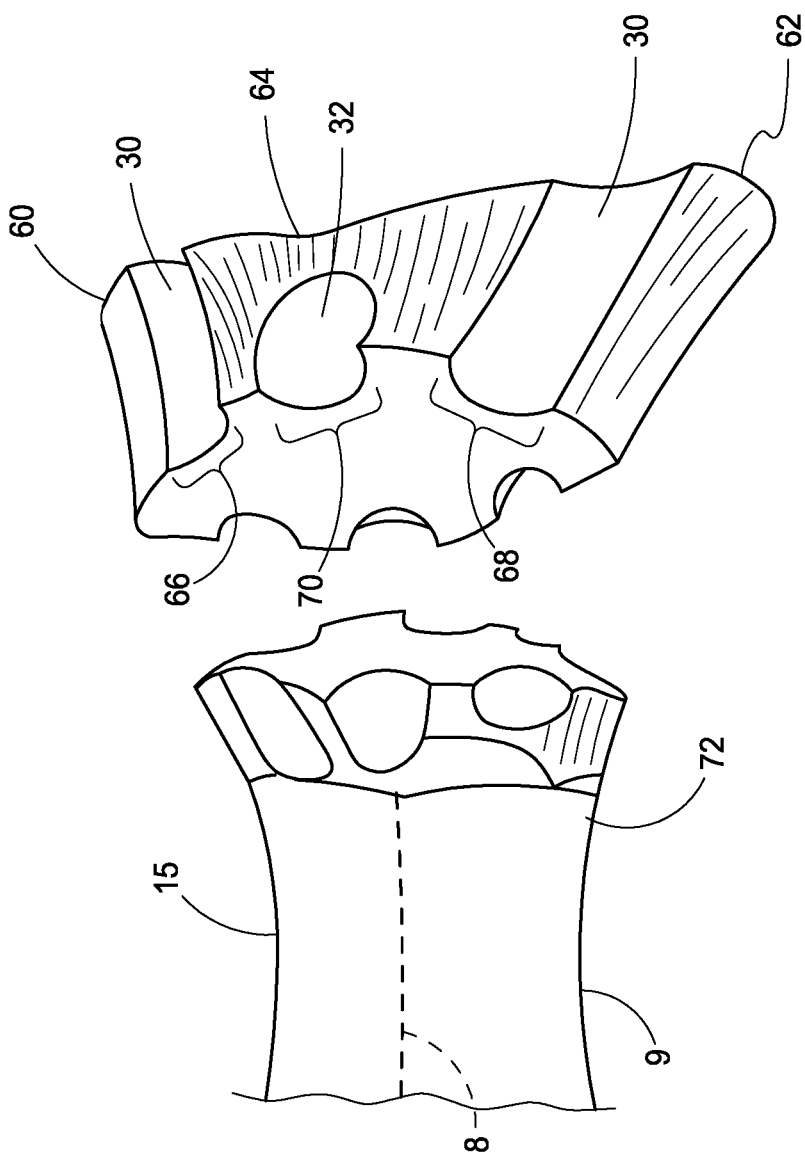
FIG. 4 is a cross section of a fish lure tail according to an embodiment of the disclosure.

In accordance with example implementations and with reference to FIGS. 3 and 4, fish lures 10 and 12 can include tail portions 11 or 13. Fish lures 10 and 12 can be considered soft bait fish lures as they are primarily constructed of a polymeric material such as polyvinyl chloride (PVC) and oil-based resin. Typically, these lures are provided by casting the PVC and resin. The tail of the lure can be defined by specific constructs that relate to other constructs of the body of the lure. For example: an end upper point 60 of the tail can be substantially aligned with dorsal side 15; an end lower point 62 of the tail can be substantially aligned with pelvic side 9; and opposing end midpoints 64 can be substantially aligned with lateral line 8. Each of end points 60, 62, and 64 can extend along individual upper 66, lower 68, and midpoint surfaces 70 of the tail to terminate at caudal peduncle 72.

In accordance with example implementations, tail portions 11 or 13 can include one or more recesses for channels 30 or 32 defined within one or more of the exterior surfaces of the tail. One or more channels 30 can be defined within surface 66 between end midpoint 64 and end upper point 60; and/or within surface 68 between end midpoint 64 and end lower point 62. Each of these channels may extend through an end surface 76 and/or 78. Additionally, one or more recesses or channels 32 can be defined within surface 70 between end midpoint 64 and caudal peduncle 72. In accordance with example implementations, a channel 32 can terminate prior to end surface 80 of the tail.

In accordance with example implementations, the tail can define opposing recesses or channels with each of the recesses or channels being within the surface between the end upper point and the end midpoint and/or between the end lower point and the end midpoint. Opposing recesses or channels can be within the surface between the end midpoint and the caudal peduncle. Additionally, the tail can define opposing lateral surfaces 82 and 84. Accordingly, each of these lateral surfaces can include individual upper 66, lower 68, and midpoint 70 surfaces. Individual channels and/or recesses can be defined within one or more of these lateral surfaces. According to another implementation, opposing surfaces can also include opposing channels or recesses.

Referring to FIG. 4, a cross section of the tail portion 11/13 is shown wherein demonstrating non-planar edges of the tail portion 11/13 when cross sectioning through recesses 30 and 32. In accordance with example implementations, the channels or recesses can be created within provided lures by removing portions of the tail of the lure. For example, portions of the tail can be carved away to reveal the recesses and/or channels of the present disclosure.

Figure 5:
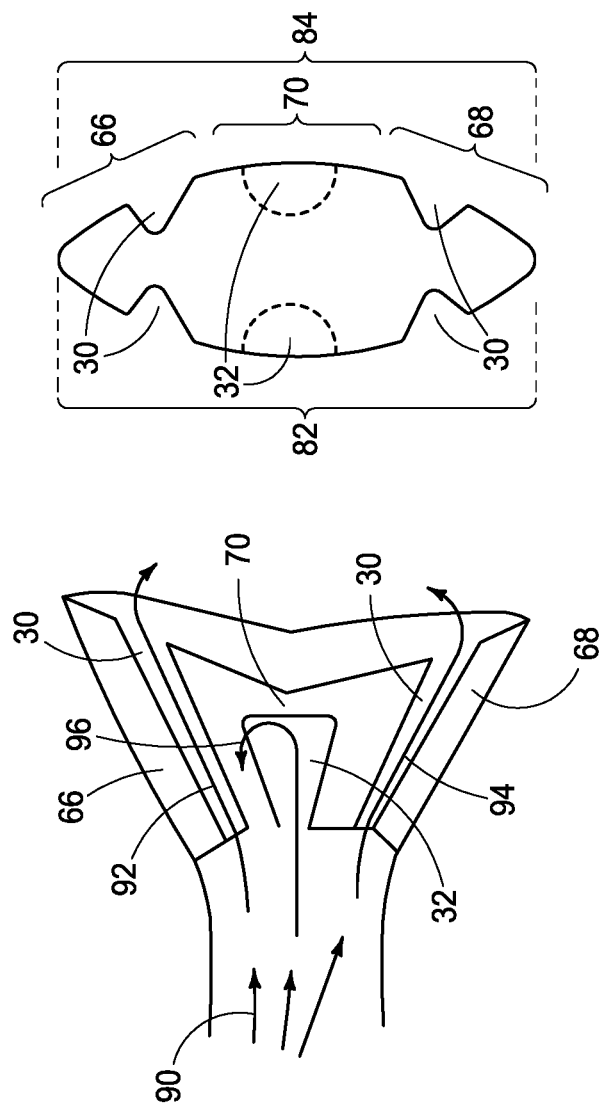
FIG. 5 is a depiction of fluid flow about the tail of FIG. 4, according to an embodiment of the disclosure.

Referring to FIG. 5, detailed side and end views of a tail is depicted with water directional arrows. As can be seen the water supporting the lure can proceed through upper and lower channels relatively unimpeded while the middle channel is blocked providing resistance to fluid flow. Accordingly, while providing water flow 90 from head to tail across the lure, for example, via trolling, water flow 92, 94, and/or 96 can flow along defined paths and as a result direct a desired motion of the tail. Accordingly, channels 92 and 94 can direct flow through the end of the tail. This, according to example implementations, can stabilize the upper and lower portions of the tail, preventing twisting of the tail. Also, recess or channel 32 can direct flow 92 to a terminus thus using the force of flow 92 to move the midpoint of the tail from side to side, emulating a swimming fish.

Figure 6:
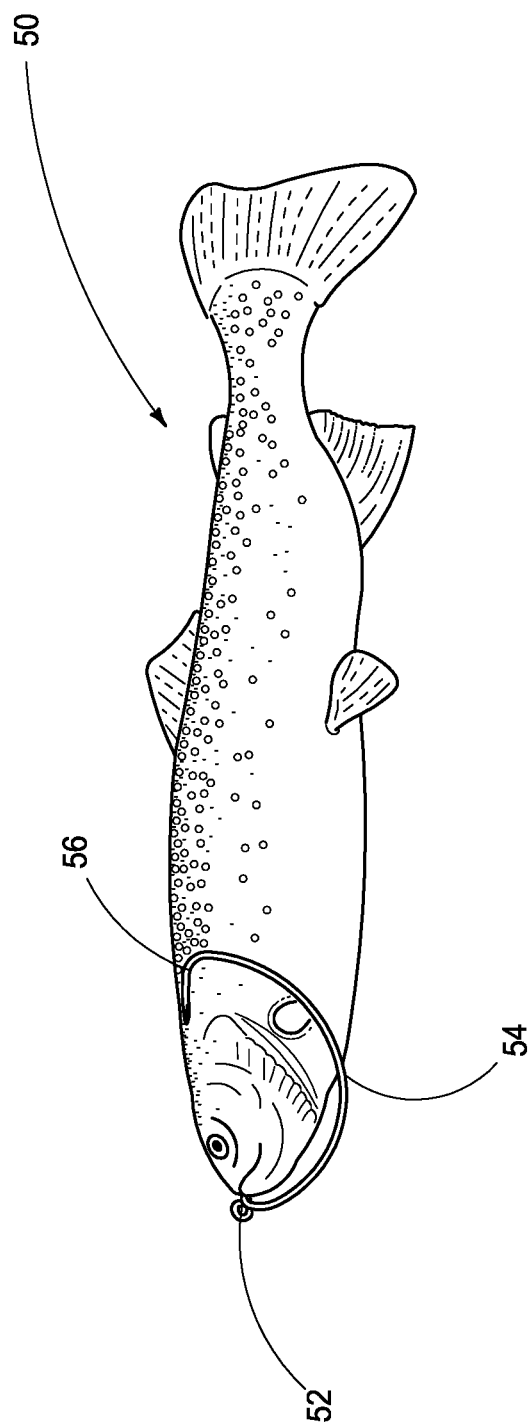
FIG. 6 is a fish lure according to an embodiment of the disclosure.

Referring next to FIG. 6, and in accordance with another implementation of the present disclosure, a fish lure 50 is provided that includes an eyelet 52 connected to a hook 54. Hook 54 can be embedded within the soft body of the lure and extend to a tip of hook or barbed end 56. In accordance with example implementations, this hook is shown on the exterior of the lure; however, in working implementations, the hook will be in the interior of the lure with a portion or none of the hook extending through the soft pliable material of the lure.

In compliance with the statute, embodiments of the invention have been described in language more or less specific as to structural and methodical features. It is to be understood, however, that the entire invention is not limited to the specific features and/or embodiments shown and/or described, since the disclosed embodiments comprise forms of putting the invention into effect.

The invention claimed is:

1. A soft bait lure emulating a fish, the lure comprising:
 a fish emulating body extending from a head to a tail, the tail defining:
  an end upper point substantially aligned with a dorsal line of the body;
  an end lower point substantially aligned with a pelvic line of the body; and
  opposing end mid points substantially aligned with lateral lines of the body, each of these end points extending along individual upper, lower, and midpoint surfaces of the tail to terminate at a caudal peduncle of the lure, wherein at least one of the exterior surfaces of the tail defines a channel within the surface between at least one end midpoint and the end upper point, wherein the channel extends through an end surface of the tail.

2. The soft bait lure of claim 1 wherein the tail defines another channel within the surface between at least one of the end midpoints and the caudal peduncle.

3. The soft bait lure of claim 2 wherein the other channel terminates prior to an end surface of the tail.

4. A soft bait lure emulating a fish, the lure comprising:
 a fish emulating body extending from a head to a tail, the tail defining:
  an end upper point substantially aligned with a dorsal line of the body;
  an end lower point substantially aligned with a pelvic line of the body; and
  opposing end mid points substantially aligned with lateral lines of the body, each of these end points extending along individual upper, lower, and midpoint surfaces of the tail to terminate at a caudal peduncle of the lure, wherein at least one of the exterior surfaces of the tail defines a channel within the surface between at least one end midpoint and the end lower point, wherein the channel extends through an end surface of the tail.

5. The soft bait lure of claim 1 wherein the tail defines opposing channels, each of the opposing channels being the channel within the surface between at least one end midpoint and the end upper point.

6. The soft bait lure of claim 1 wherein the tail defines opposing channels, each of the opposing channels being another channel within the surface between at least one of the end midpoints and the caudal peduncle.

7. The soft bait lure of claim 4 wherein the tail defines opposing channels, each of the opposing channels being the channel within the surface between at least one end midpoint and the end lower point.

\* \* \* \* \*